(12) United States Patent
Yan et al.

(10) Patent No.: US 12,668,656 B2
(45) Date of Patent: Jun. 30, 2026

(54) HYDROGENATED STYRENIC BLOCK COPOLYMERS AND COMPOSITIONS THEREOF

(71) Applicant: Kraton Corporation, Houston, TX (US)

(72) Inventors: Jiaqi Yan, Houston, TX (US); John Flood, Houston, TX (US)

(73) Assignee: Kraton Corporation, The Woodlands, TX (US)

( * ) Notice: Subject to any disclaimer, the term of this patent is extended or adjusted under 35 U.S.C. 154(b) by 584 days.

(21) Appl. No.: 18/304,429

(22) Filed: Apr. 21, 2023

(65) Prior Publication Data

US 2023/0340178 A1      Oct. 26, 2023

Related U.S. Application Data

(60) Provisional application No. 63/363,408, filed on Apr. 22, 2022.

(51) Int. Cl.
C08F 293/00      (2006.01)
C08L 23/06      (2006.01)

(52) U.S. Cl.
CPC ............ C08F 293/00 (2013.01); C08L 23/06 (2013.01); C08L 2207/062 (2013.01)

(58) Field of Classification Search
CPC ... C08F 293/00; C08L 23/06; C08L 2207/062
See application file for complete search history.

(56) References Cited

U.S. PATENT DOCUMENTS

| | | | |
|---|---|---|---|
| 2003/0181584 A1 | 9/2003 | Handlin et al. | |
| 2009/0061248 A1* | 3/2009 | Hoshi | C08F 297/04 |
| | | | 524/505 |
| 2009/0062420 A1* | 3/2009 | Dubois | G03F 7/033 |
| | | | 525/98 |
| 2011/0262686 A1 | 10/2011 | Wright et al. | |
| 2018/0237556 A1 | 8/2018 | Ichino et al. | |

FOREIGN PATENT DOCUMENTS

| | | | | |
|---|---|---|---|---|
| EP | 1064347 B1 | 7/2003 | | |
| EP | 3255073 A1 | 12/2017 | | |
| EP | 3263613 A1 * | 1/2018 | ............. | C08L 53/02 |
| WO | WO-2017194969 A1 * | 11/2017 | ......... | B29C 45/0001 |

* cited by examiner

*Primary Examiner* — Catherine S Branch
*Assistant Examiner* — Andrea Wu

(57)      ABSTRACT

A hydrogenated styrenic block copolymer (HSBC) is disclosed represented by at least one formula selected from S-EP-EB, (S-EP-EB)$_n$X, and S-EP-EB-EP-S, wherein n is from 2 to 30 and X is a residue of a coupling agent. Prior to hydrogenation, each block S is a polymer block of a vinyl aromatic monomer, each block EP is a polyisoprene block, and each block EB is a polybutadiene block. The HSBC has a polystyrene content (PSC) of 5 to 20 wt. %, and a peak molecular weight ($M_p$) of 45 to 300 kg/mol. A thermoplastic composition is disclosed containing the HSBC and a polyolefin. The thermoplastic composition shows improved impact performance and toughness.

20 Claims, No Drawings

HYDROGENATED STYRENIC BLOCK COPOLYMERS AND COMPOSITIONS THEREOF

RELATED APPLICATIONS

This application claims benefit to U.S. provisional application No. 63/363,408, filed on Apr. 22, 2022, which is hereby incorporated herein by reference.

TECHNICAL FIELD

The disclosure relates to a hydrogenated styrenic block copolymer (HSBC), compositions, and applications thereof.

BACKGROUND

Polyolefins are used worldwide in a large quantity in various applications. Polyolefin compositions can incorporate many other polymers and additives in attempting to enhance the composition's impact strength along with other properties. Achieving desired impact strength of polyolefin compositions is challenging, particularly in the case of recycled polyolefin compositions.

Thermoplastic elastomers (TPEs) can be used for improving the impact strength of polyolefin compositions. Some of the known TPEs include elastomeric alloy, engineering polymers (e.g., copolyester (COPE) elastomers, copolyamide (COPA) elastomers, etc.), olefin based (also known as thermoplastic olefins or TPOs), polyurethanes, and styrene based.

Styrenic block copolymers (SBCs) containing vinyl aromatic compounds and conjugated dienes are well known in the art and exhibits elasticity comparable to that of natural and/or synthetic rubber. Moreover, the processability of SBCs at high temperatures can be compared with thermoplastic resins. The SBC can be used as a compatibilizer as well as an impact modifier for polyolefin compositions.

There is still a need to develop a styrenic block copolymer when added to a thermoplastic composition, provides improved impact strength, and maintain and/or enhance other mechanical properties of the thermoplastic composition.

SUMMARY

In a first aspect, the disclosure relates to a hydrogenated styrenic block copolymer (HSBC) comprising, consisting essentially of, or consists of at least one formula selected from: S-EP-EB, (S-EP-EB)$_n$X, and S-EP-EB-EP-S, wherein n is from 2 to 30 and X is a residue of a coupling agent. Prior to hydrogenation, each block S is a polymer block of a vinyl aromatic monomer, the block S has a true molecular weight of 2 to 15 kg/mol; each block EP is a polyisoprene block derived from isoprene monomer, the block EP has a true molecular weight of 30 to 70 kg/mol; and each block EB is a polybutadiene block derived from 1,3-butadiene monomer, the block EB has a true molecular weight of 10 to 70 kg/mol, and a vinyl content of 10 to 90 wt. %, based on total weight of the polymerized 1,3-butadiene monomer in the block EB. After hydrogenation, each polyisoprene block and polybutadiene block is hydrogenated to a hydrogenation level of greater than 90%. The HSBC has: a hydrogenation level in the EP block and the EB block of greater than 90%, a polystyrene content (PSC) of 5 to 20 wt. %, and a peak molecular weight ($M_p$) of 40 to 300 kg/mol.

In a second aspect, the HSBC has a melt flow index (MFI) at 230° C. with 5 kg load of 1 to 40 g/10 min.

In a third aspect, the block EB, prior to hydrogenation, has a vinyl content of 25 to 80 wt. %, based on total weight of the polymerized 1,3-butadiene monomer in the block EB.

In a fourth aspect, the block EB, prior to hydrogenation, has a vinyl content, of 20 to 65 wt. %, based on total weight of the polymerized 1,3-butadiene monomer in the block EB.

DETAILED DESCRIPTION

The following terms will be used throughout the specification.

"Selected from [a group such as A, B, and C]" or "any of [a group such as A, B, and C]" means a single member from the group, more than one member from the group, or a combination of members from the group. For example, "selected from A, B, and C" includes, for example, A only, B only, or C only, as well as A and B, A and C, B and C, or all of A, B, and C.

"At least one of X, Y, and Z" means a single member, "X" only or "Y" only or "Z" only, or more than one member from the group, e.g., "X" and "Y," "X, Y, and Z," etc.

A list of embodiments presented as "A, B, or C" is to be interpreted as including the embodiments: A only, B only, C only, "A or B," "A or C," "B or C," or "A, B, or C."

"Vinyl content" refers to the content of a conjugated diene that is polymerized via 1,2-addition in the case of 1,3-butadiene, or via 3,4-addition in the case of isoprene, resulting in a monosubstituted olefin, or vinyl group, adjacent to the polymer backbone. Vinyl content can be measured by nuclear magnetic resonance spectrometry (NMR).

"Coupling efficiency", or CE refers to values of wt. % of a coupled polymer and wt. % of an uncoupled polymer. Wt. % of the coupled polymer and the uncoupled polymer can be determined using a GPC and output of the differential refractometer (RI) detector. The intensity of the signal at a specific elution volume is proportional to the amount of material detected at that elution volume. The area under the curve spanning the $M_W$ range corresponding to the coupled polymer is representative of wt. % of the coupled polymer, and likewise for the uncoupled polymer. The percentage CE is given by 100 times the wt. % of the coupled polymer/(wt. % of the coupled polymer+wt. % of the uncoupled polymer). The CE can also be measured by calculating data from the GPC, dividing the integrated areas below the GPC curve of all coupled polymers (including two-arm, three-arm, four-arm, etc.) by the same of the integrated areas below the GPC curve of both coupled and uncoupled polymers.

"Order-disorder-transition temperature" or ODT refers to a temperature at which a block copolymer experience the transition between phase separated and non-phase separated states. ODT is defined as the temperature above which a zero shear viscosity can be measured by dynamic rheology. ODT can be measured using dynamic mechanical analysis (DMA), with temperature sweeps performed over various frequencies, wherein ODT is identified as the temperature where complex viscosity begins to collapse to a single value at low frequencies.

"Polystyrene content" or PSC of a block copolymer refers to wt. % of a polymerized vinyl aromatic monomer, e.g., styrene in the block copolymer, calculated by dividing the sum of the molecular weight of all polymerized vinyl aromatic units by the total molecular weight of the block copolymer. PSC can be determined using any suitable methodology such as proton nuclear magnetic resonance (NMR).

"Molecular weight" or $M_w$ refers to the styrene equivalent molecular weight in kg/mol of a polymer block or a block copolymer. $M_w$ can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. $M_w$ of polymers measured using GPC so calibrated are styrene equivalent molecular weights or apparent molecular weights. $M_w$ expressed herein is measured at the peak of the GPC trace and are commonly referred to as styrene equivalent "peak molecular weight," designated as $M_p$.

"True molecular weight" refers to a molecular weight which can only be obtained when the sample is the same type as calibration standards.

The disclosure relates to a hydrogenated styrenic block copolymer (HSBC) comprising, prior to hydrogenation, a block S of a polymerized vinyl aromatic monomer, a block EP of a polyisoprene block, and a block EB of a polybutadiene block. The HSBC can be used as an impact modifier in a thermoplastic composition, thereby improving impact and toughness properties.

(Hydrogenated Styrenic Block Copolymer)

The HSBC is represented by at least one formula selected from: S-EP-EB, $(S-EP-EB)_n X$ and S-EP-EB-EP-S, having n ranges from 2-10, or 2-8, or 2-4, and X is a residue of a coupling agent. The HSBC is formed by hydrogenation of a styrenic block copolymer (SBC) precursor. Before hydrogenation, the SBC precursor comprises block S of a polymer block derived from a vinyl aromatic monomer, block EP of a polyisoprene block derived from isoprene monomer, and block EB of a polybutadiene block derived from 1,3-butadiene monomer. The vinyl aromatic monomer can be introduced or copolymerized into the blocks EP and EB by any order and in any distribution to form any of configurations as described.

In embodiments, the vinyl aromatic monomer is selected from the group consisting of styrene, alpha-methylstyrene, methyl styrene, para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene, dimethyl styrene, halogenated styrene, methoxy styrene, acetoxy styrene, vinyl toluene, isomers of vinyl toluene, vinyl xylene, 4-vinylbiphenyl, vinyl naphthalene, vinyl anthracene, and mixtures thereof.

In embodiments, the block EP is derived from isoprene monomer and has a vinyl content, prior to hydrogenation, of 6-40, or 8-35, or 10-30 wt. %, based on total weight of the polymerized isoprene monomer in the block EP.

In embodiments, the block EB is derived from 1,3-butadiene monomer and has a vinyl content, prior to hydrogenation, of 10-90, 15-85, or 25-80, or 20-65, or 15-50 wt. %, based on total weight of the polymerized 1,3-butadiene monomer in the block EB.

In embodiments, the block EB contains 1,3-butadiene monomer incorporated by 1,2 addition in an amount of 15-50, or 18-45, or 20-40 wt. %, based on total weight of the polymerized 1,3-butadiene monomer in the block EB, with the remainder being 1,4 addition.

In embodiments, the block S constitutes from 5-25, or 6-22, or 7-20, or 8-15 wt. %, the block EP constitutes from 40-65, or 45-60, or 45-65 wt. %, and the block EB constitutes from 10-35, or 12-30, or 15-25 wt. %, based on total weight of the HSBC.

The block S derived from the polymerized vinyl aromatic monomer can be essentially left unhydrogenated. In embodiments, the block S has a hydrogenation level of <30, or <20, or <10, or <5%, based on total double bonds present in the block S. In embodiments, the polyisoprene block is hydrogenated to a hydrogenation level of >80, or >85, or >90, or >95, or >98, or >99 or up to 100%, based on total double bonds present in the polyisoprene block. In embodiments, the polybutadiene block is hydrogenated to a hydrogenation level of >80, or >85, or >90, or >95, or >98, or >99 or up to 100%, based on total double bonds present in the polybutadiene block. The hydrogenation level refers to the percentage of original unsaturated bonds which become saturated upon hydrogenation, which can be determined using UV-VIS spectrophotometry and/or proton NMR and/or via ozonolysis titration.

In embodiments, the HSBC has a random polymer block of ethylene-propylene (EP), and a random polymer block of ethylene-butylene (EB). In embodiments, the HSBC is selected from styrene-ethylene-propylene-ethylene-butylene (S-EP-EB), styrene-ethylene-propylene-ethylene-butylene-ethylene-propylene-styrene (S-EP-EB-EP-S), and mixture thereof.

In embodiments, prior to hydrogenation, the block S has a true molecular weight of 2-15, or 3-12, or 4-10, or 5-8 kg/mol. In embodiments, prior to hydrogenation, the block EP has a true molecular weight of 30-70, or 35-65, or 40-60 kg/mol. In embodiments, prior to hydrogenation, the block EB has a true molecular weight of 10-70, or 15-65, or 20-65, or 10-40 kg/mol.

In embodiments, prior to hydrogenation, the block EP has a peak molecular weight ($M_p$) of 30-100, or 40-90, or 50-80, or 40-80 kg/mol. In embodiments, prior to hydrogenation, the block EB has a peak molecular weight ($M_p$) of 10-90, or 20-85, or 30-80, or 25-70 kg/mol.

In embodiments, the HSBC has a peak molecular weight ($M_p$) of 40-300, or 60-290, or 80-280, or 100-300, or 110-280 kg/mol.

In embodiments, the HSBC has a polystyrene content (PSC) of 5-20, or 6-18, or 7-15, or 8-14 wt. %, based on total weight of the HSBC.

In embodiments, the HSBC has a crystallinity of 2-10, or 2.5-9, or 3-8, or 3.5-7%, measured by differential scanning calorimetry (DSC), according to ASTM F2625.

(Methods of Preparation of HSBC)

The HSBC is prepared by first making a SBC precursor as disclosed in U.S. Pat. No. 7,449,518, incorporated herein by reference. The SBC precursor can be prepared by anionic polymerization or by sequential (or successive) polymerization. In embodiments, the polymerization of the monomers is performed by stepwise addition of the monomer to the solution containing an initiator, followed by coupling of the resulting sequential block copolymer chains with the coupling agent (if present).

In embodiments, the SBC precursor is prepared via sequential polymerization, with the steps being similar to those used for anionic polymerizations, at a temperature of −30 to 150° C., or 10 to 100° C., or 30 to 90° C. The polymerization is carried out in an inert atmosphere, e.g., nitrogen, or under pressure ranges from 0.5 to 65 bars. The polymerization generally requires <12 hrs., or from 5 min. to 5 hrs., depending on factors including temperature, concentration of monomer components, desired molecular weight of the polymer, etc.

In embodiments, the coupling agent is selected from the group consisting of di- or multivinylarene compounds; di- or multiepoxides; di- or multiisocyanates; di- or multialkoxysilanes; di- or multiimines; di- or multialdehydes; di- or multiketones; alkoxytin compounds; di- or multihalides, such as silicon halides and halosilanes; mono-, di-, or multianhydrides; di- or multiesters, such as the esters of monoalcohols with polycarboxylic acids; diesters which are esters of monohydric alcohols with dicarboxylic acids; diesters which are esters of monobasic acids with polyalcohols such as glycerol; and mixtures thereof.

In embodiments, an effective amount of the coupling agent is employed to obtain a desired coupling efficiency (CE) for the SBC precursor. In embodiments, the SBC precursor when coupled, has a CE of >20%, >40%, >50%, or >60%, or >70%, or >80%, or >90%, or 10-90%, or 20-85%, or 30-80%, or 20-60%.

The SBC precursor is then hydrogenated to obtain the HSBC using a hydrogenation process as disclosed in U.S. Pat. Nos. 3,670,054, and 3,700,633, incorporated herein by reference. Any hydrogenation process that is selective for the double bonds in the conjugated diene blocks, leaving the aromatic unsaturation in the vinyl aromatic blocks substantially intact, can be used to prepare the HSBC.

In embodiments, the hydrogenation process employs a catalyst or catalyst precursor comprising a metal, e.g., nickel, titanium, or cobalt, and a suitable reducing agent such as an alkyl aluminum. Catalyst concentration can range from 10 to 500 ppm. The hydrogenation of the SBC precursor is controlled by using a low hydrogenation temperature ranges from 25-175° C., or 35-150° C., or 50-100° C. Typically, the hydrogenation is conducted for a period ranging from 5 min.-8 hours, or 30 min.-4 hours. The hydrogenation can be conducted at a hydrogen pressure around 3,000 psig, or 100-1500 psig, or 200-800 psig.

(Thermoplastic Composition)

A thermoplastic composition can be prepared by comprising, based on total weight of the thermoplastic composition: (a) 80-98 wt. % of a polyolefin, (b) 2-20 wt. % of a HSBC, and (c) 0-10 wt. % of at least an additive; alternatively, (a) 82-97 wt. % of the polyolefin, (b) 3-18 wt. % of the HSBC, and (c) 0-10 wt. % of at least an additive.

In embodiments, the HSBC is used in amounts of 2-20, or 3-18, or 4-16 wt. %, based on total weight of the thermoplastic composition. In embodiments, the polyolefin is added in amounts of 80-98, or 82-97, or 84-96 wt. %, based on total weight of the thermoplastic composition.

In embodiments, the polyolefin is selected from the group consisting of polyethylene (PE), polypropylene (PP), polybutylene (PB), polyisobutylene, ethylene propylene rubber, polyvinylchloride (PVC), polydiene (e.g., poly-1,3-butadiene or poly-1,2-butadiene), polyisoprene, polydicyclopentadiene, polyethylidene norbornene, polyvinyl norbornene, or homogeneous or heterogeneous composites thereof, or copolymers thereof (e.g., EPDM rubber, i.e., ethylene propylene diene monomer), low density polyethylene (LDPE), linear low density polyethylene (LLDPE), very low density polyethylene (VLDPE), high density polyethylene (HDPE), medium density polyethylene (MDPE), high molecular weight polyethylene (HMWPE), and ultra-high molecular weight polyethylene (UHMWPE), high molecular weight high density polyethylene (HMW HDPE), ultrahigh molecular weight high density polyethylene (UHMW HDPE), branched low density polyethylene (BLDPE), low density polypropylene (LDPP), high density polypropylene (HDPP), high melt strength polypropylene (HMS-PP), high impact polypropylene (HIPP), isotactic polypropylene (iPP), syndiotactic polypropylene (sPP), and mixtures thereof. In certain embodiments, polyolefins are linear or branched and/or formulated with or without crosslinking (e.g., chemical crosslinking).

The polyolefin can be based on ethylene copolymers containing ethylene and a comonomer from $C_3$-$C_{20}$ α-olefin, e.g., propene, isobutylene, 1-butene, 1-pentene, 1-hexene, 1-heptene, 1-octene, isobutylene, 4-methyl-1-pentene, styrene, cycloolefins such as cyclopentene, cyclohexene, norbornene, dienes such as butadiene, isoprene, 1,4-hexadiene, cyclopentadiene, dicyclopentadiene, norbornadiene, or ethylidenenorbornene. The polyolefin can be a copolymer of ethylene and comonomers, e.g., propylene, 1-butene, 1-hexene, 1-pentene, 1-heptene, 1-octene, 1-nonene, 1-decene, and the like.

Other examples of polyolefins include homopolymers/copolymers of linear or cyclic olefin monomers selected from 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, such as 1,3-butadiene, 1,3-pentadiene, 1,4-hexadiene, 1,5-hexadiene, 1,7-octadiene, 1,9-decadiene, and the like.

In embodiments, the polyolefin is based on a post-consumer recycle (PCR)/post-industrial recycle (PIR) source. In embodiments, the PCR mixture has majority of a recycled HDPE (PCR-HDPE) with small amount of a recycled PP (PCR-PP).

In embodiments, the PCR-HDPE comprises an amount of the PCR-PP from 1-20, or 2-15, or 5-15, or >1, or >2, or >5, or >8, or >10, or >12, or <15, or <20 wt. %, based on total weight of the PCR-HDPE.

In embodiments, the polyolefin is polyethylene having a melt flow index at 190° C. with 2.16 kg load of 0.1-50, or 0.2-45, or 0.5-42, or 1-40, or 2-35, or 5-30 g/10 min, measured according to ASTM D1238.

In embodiments, the polyolefin is polypropylene with a melt flow index at 190° C. and with 2.16 kg load of 0.1-1000, 0.5-950, or 1-900, or 2-800, or 5-750, or 10-700, or 20-600, or 30-550, or 50-500 g/10 min, measured according to ASTM D1238.

(Optional Additives)

In embodiments, the thermoplastic composition further comprises at least an additive selected from the group consisting of activators, curing agents, thickeners, coalescing agents, slip agents, release agents, antimicrobial agents, antioxidants, antiozonants, color change pH indicators, plasticizers, tackifiers, film forming additives, dyes, pigments, UV stabilizers, UV absorbers, catalysts, fillers, flame retardants, viscosity modifiers, wetting agents, deaerators, toughening agents, adhesion promoters, colorants, heat stabilizers, lubricants, flow modifiers, drip retardants, antistatic agents, stress-relief additives, blowing agents, foam nucleating agents, weld line strength promoter, and mixtures thereof.

In embodiments, the additive is added in amounts of 0-10, or 0.5-8, or 1-5, or >1, or <10 wt. %, based on total weight of the thermoplastic composition.

In embodiments, the thermoplastic composition further comprises at least one other polymer different from HSBC and polyolefin. Such other polymer can be selected from the group consisting of polyesters, polyamides, polyimides, polyethers, polylactic acids, polyethylene glycols, poly(vinyl alcohols), polyurethanes, poly(acrylic acids), poly(acrylamides), polyethylene terephthalates, polybutylene terephthalates, poly(butyl succinates), polycarbonates, polyetherimides, polyphenyloxides, polystyrenes, poly(methyl methacrylates), poly(n-vinyl-pyrrolidones), polyethylenimenes, poly(dimethyl acrylamide), polyether ketone ketone (PEKK), polytetrafluoroethylene (PTFE), polyacrylates, poly(dimethylsiloxanes), and mixtures thereof.

(Methods of Preparation of Thermoplastic Composition)

In embodiments, the thermoplastic composition is prepared by a dry blending or compounding process which is then subjected to melt-processing.

In embodiments, the thermoplastic composition is prepared by compounding, which is achieved by any conventional compounding operation, e.g., single and twin screw extruders, Banbury mixers, Brabender mixers, Farrel continuous mixers, two roll mixers, and the like. The order of mixing and the form of the blend components to be mixed is not critical. The mixing temperatures are chosen in such a way that an intimate blend of the components is obtained. Typical temperatures are above the softening or melting points of at least one of the components.

(Properties of HSBC)

In embodiments, the HSBC has an ODT of 150-320° C., or 180-300° C., or 210-280° C.

In embodiments, the HSBC has a melt flow index (MFI) at 230° C. with 5 kg load of 1-40, or 2-30, or 1-25, or >1, or >2, or <25 g/10 min, measured according to ASTM D1238.

In embodiments, the HSBC containing a rubbery block (block EP and block EB) has a glass transition temperature ($T_g$) of –70 to 0° C., or –65 to –10° C., measured by DSC, according to ASTM F2625.

In embodiments, the block EB has a melting point of 40-100° C., or 50-90° C., or 55-80° C., measured by DSC, according to ASTM F2625.

In embodiments, a film specimen of the HSBC obtained by compression molding at 200-230° C., has a thickness of 10-500 μm, or 50-400 μm, or 70-300 μm. The compression molded film has at least one of: a 100% modulus from 1-5, or 1.5-4, or 2.5-3.5 MPa; a 300% modulus from 2-6, or 2.5-5.5, or 3-5 MPa; a 500% modulus from 2.5-7, or 3-6.5, or 3.5-6 MPa; an ultimate stress of 4-25, or 4.5-22, or 5-20 MPa; and an ultimate strain from 600-1400, or 650-1350, or 700-1300, or 750-1250%. All properties are measured according to ASTM D412.

In embodiments, a film specimen of the HSBC obtained by melt casting through one inch Killion single layer cast film line at 410-440° F. and pressure of 700-900 psi at an extruder speed of 18 rpm, has a thickness of 10-500 μm, or 50-400 μm, or 70-300 μm. Properties of melt casted film are measured in both machine direction (MD) and transverse direction (TD) according to ASTM D412, has at least one of: a 100% modulus from 1-5, or 1.5-4, or 2.5-3.5 MPa; a 300% modulus from 2-6, or 2.5-5.5, or 3-5 MPa; a 500% modulus from 2.5-8, or 3-7.5, or 3.5-7, or 4-6.5 MPa; an ultimate stress of 2.5-25, or 3-22, or 3.5-20 MPa; and an ultimate strain from 250-1100, or 300-1050, or 300-1000%.

(Properties of Thermoplastic Composition)

The HSBC when incorporated in a thermoplastic composition, provides improved impact performance, particularly at low temperature (–30° C.). A thermoplastic composition containing polyolefin and the HSBC shows better tensile strength, elongation to break, and Elmendorf tear strength when compared with the thermoplastic compositions in absence of the HSBC.

In embodiments, a thermoplastic composition has a Young's modulus of 500-800, or 520-790, or 540-780, or 550-760 MPa, measured according to ASTM D412.

In embodiments, the thermoplastic composition has a tensile strain at yield of 5-15, or 5.5-14, or 6-12, or 6.5-10, or 7-11%, measured according to ASTM D412.

In embodiments, the thermoplastic composition has a tensile stress at yield of 10-25, or 11-22, or 11.5-20, or 12-18 MPa, measured according to ASTM D412.

In embodiments, the thermoplastic composition has an ultimate strain at break of 200-500, or 220-480, or 240-460, or 260-450%, measured according to ASTM D412.

In embodiments, the thermoplastic composition has a flexural modulus of 300-680, or 320-670, or 330-660, or 340-650 MPa, measured according to ASTM D412.

In embodiments, the thermoplastic composition has an Elmendorf tear resistance of 150-400, or 160-380, or 170-370, 180-360, or 200-350 gf/mil, measured according to ASTM D1922.

In embodiments, the thermoplastic composition has a linear resilience, measured according to ASTM D256, at room temperature of 650-1000, or 680-950, or 700-920, or 700-900 J/m; at –20° C. of 700-1100, or 710-1080, or 720-1050, or 730-1040 J/m; and at –30° C. of 600-1100, or 610-1080, or 620-1050 J/m.

(End-Use Applications)

The HSBC can be incorporated in variety of thermoplastic compositions to improve impact performance and can be used as a compatibilizer to compatibilize two or more different polyolefins in polyolefin blends.

Thermoplastic compositions containing polyolefin and the HSBC can be used for forming articles by using EBM process. In embodiments, hollow articles are prepared from the thermoplastic composition, e.g., bottles, containers, fuel tanks, drums, etc. Other molded articles include furniture, signage, wheels, toys, gardening products, 3D-printed articles, and the like. The thermoplastic composition can be used in production of fiber and has applications in woven and non-woven fabrics.

The thermoplastic composition can be used to form articles by any of injection blow molding, injection molding, extrusion blow molding, coextrusion molding, cast film extrusion, blown film extrusion, injection stretch blow molding (ISBM), rotational molding, thermoforming, thermofusion, foam blow molding, pultrusion, calendaring, additive manufacturing, or other known processing methods.

In embodiments, the thermoplastic composition is particularly used for making pipes. The pipe made from thermoplastic composition helps to stop slow and rapid crack propagation.

EXAMPLES

The following examples are intended to be non-limiting.

Injection molded Izod bars were prepared from the thermoplastic composition for impact and flexural modulus testing. The temperature for injection molding used was in the range of 130-430° F. and pressure from 9500-11000 psi.

The following materials are used.

HDPE1 (ELITE™ 5960G1, from Dow) with a Vicat softening temperature of 130° C., a melting temperature (DSC) of 134° C., a density of 0.962 g/cm$^3$, a melt index of 0.85 g/10 min (190° C., 2.16 kg).

Example 1

Preparation of thermoplastic compositions. Components of the thermoplastic composition were mixed using a 25 mm Berstorff twin screw extruder in the temperature range from 170-230° C.

Tables 1 and 2 show details of different HSBCs used for the preparation of thermoplastic compositions. HSBC1, HSBC2, and HSBC3 have a configuration of (EB-S/EB-S)$_n$X. HSBC4 has a configuration of S-EP-EB, HSBC5 and HSBC6 have a configuration of (S-EP-EB)$_n$X, and HSBC7 has a configuration of S-EB-S.

Properties of HSBC's are presented in table 3.

TABLE 3

| Examples | ODT (° C.) | Midblock $T_g$ DSC/DMA (° C.) | $T_c$ of EB Block (° C.) | $T_m$ of EB Block (° C.) | Crystallinity (wt. %) |
|---|---|---|---|---|---|
| HSBC1 | None | −35.8/−19.2 | 43.1 | 77.6 | 4.41 |
| HSBC2 | None | −35.6/−18.2 | 41.2 | 75.4 | 4.51 |
| HSBC3 | None | −36.3/−18.2 | 37.5 | 71.4 | 4.09 |
| HSBC4 | 230-250 | −55.8/−43.8 | 28.6 | 64.5 | 4.03 |
| HSBC5 | 250-270 | −56.1/−42.7 | 29.2 | 61.3 | 4.64 |
| HSBC6 | 230-250 | −56.0/−42.6 | 29.4 | 63.0 | 4.61 |

Film specimens of HSBCs were prepared by compression molding at 200-230° C. and by melt casting at 430° F. Mechanical property results are shown in tables 4 and 5.

TABLE 4

| | Compression molded film (200 μm) | | | Melt cast film (100 μm) HSBC2 | |
|---|---|---|---|---|---|
| | HSBC1 | HSBC2 | HSBC3 | MD | TD |
| 100% Modulus (MPa) | 1.5 | 1.8 | 1.7 | 2.0 | 1.9 |
| 300% Modulus (MPa) | 2.2 | 3.0 | 2.9 | 3.4 | 3.1 |
| 500% Modulus (MPa) | 2.9 | 4.5 | 4.0 | 4.7 | 4.3 |
| Ultimate stress (MPa) | 2.4 | 4.5 | 3.6 | 3.9 | 4.3 |
| Ultimate strain (%) | 1350 | 760 | 610 | 790 | 720 |

TABLE 1

| HSBCs | EB block true mol. wt. (kg/mol) | EB block St. Eq. mol. wt. (kg/mol) | S/EB-S St. Eq. mol. wt. (kg/mol) | S/EB-S St. Eq. mol. wt. (kg/mol) | Vinyl content in EB (%) | Overall vinyl content (wt. %) | CE (wt. %) | MFR (g/10 min.) (230° C., 2.16 kg) |
|---|---|---|---|---|---|---|---|---|
| HSBC1 | 20.6 | 38.2 | 42.2 | 63.6 | 20.7 | 34.1 | 46.2 | 11.3 |
| HSBC2 | 20.0 | 37.1 | 41.6 | 62.8 | 22.4 | 35.2 | 77.8 | 8.40 |
| HSBC3 | 19.9 | 36.9 | 41.8 | 63.1 | 24.1 | 35.5 | 75.0 | 8.57 |

St. Eq. mol. wt. is a styrene equivalent molecular weight.

TABLE 2

| HSBC's | PS block true mol. wt. (kg/mol) | EP block true mol. wt. (kg/mol) | EP block St. Eq. mol. wt. (kg/mol) | EB block true mol. wt. (kg/mol) | EB block St. Eq. mol. wt. (kg/mol) | HSBC St. Eq. mol. wt. (kg/mol) | PSC (wt. %) | Vinyl content in EB block (wt. %) | Coupling efficiency (wt. %) | MFR (g/10 min.) (230° C., 5 kg) |
|---|---|---|---|---|---|---|---|---|---|---|
| HSBC4 | 5.95 | 51.2 | 77.8 | 20.1 | 35.3 | 136 | 7.7 | 24.7 | 0 | 8.03 |
| HSBC5 | 5.77 | 50.5 | 76.7 | 20.4 | 35.7 | 264 | 7.5 | 25.1 | 60.5 | 2.35 |
| HSBC6 | 5.82 | 50.8 | 77.2 | 20.4 | 35.7 | 136 | 7.6 | 24.7 | 32.0 | 5.17 |
| HSBC7 | 5.30 | NA | — | 61.1 | 64.6 | 145 | 13.3 | 44.0 | 71.0 | 22 |

St. Eq. mol. wt. is a styrene equivalent molecular weight.

TABLE 4-continued

| | Compression molded film (200 μm) | | | Melt cast film (100 μm) HSBC2 | |
| --- | --- | --- | --- | --- | --- |
| | HSBC1 | HSBC2 | HSBC3 | MD | TD |
| 100% Hysteresis | | | | | |
| Cycle 1 Tensile Set, % | 11 | 8.6 | 8.2 | 6.7 | 7.4 |
| Cycle 1 Rec Energy, % | 70 | 76 | 78 | 80 | 78 |

TABLE 4-continued

| | Compression molded film (200 μm) | | | Melt cast film (100 μm) HSBC2 | |
| --- | --- | --- | --- | --- | --- |
| | HSBC1 | HSBC2 | HSBC3 | MD | TD |
| 300% Hysteresis | | | | | |
| Cycle 1 Tensile Set, % | 46 | 38 | 36 | 29 | 30 |
| Cycle 1 Rec Energy, % | 54 | 59 | 61 | 62 | 62 |

MD = extrusion or machine direction, TD = transverse or cross direction, Rec energy = recovered energy.

TABLE 5

| | Compression molded film (200 μm) | | | Melt cast film (100 μm) | | | | | |
| --- | --- | --- | --- | --- | --- | --- | --- | --- | --- |
| | | | | HSBC4 | | HSBC5 | | HSBC6 | |
| | HSBC4 | HSBC5 | HSBC6 | MD | TD | MD | TD | MD | TD |
| Tensile Data | | | | | | | | | |
| 100% Modulus (MPa) | 2.1 | 2.2 | 2.2 | 2.3 | 2.1 | 2.3 | 2.3 | 2.3 | 2.4 |
| 300% Modulus (MPa) | 3.7 | 4.1 | 4 | 4 | 3.6 | 4.4 | 4.2 | 4.3 | 4.3 |
| 500% Modulus (MPa) | 4.2 | 5.8 | 4.9 | — | — | 6.3 | 5.8 | 5.0 | 5.1 |
| Ultimate stress (MPa) | 5.3 | 18.8 | 9.6 | 4 | 3.6 | 18.6 | 17.8 | 11.3 | 11.0 |
| Ultimate strain (%) | 810 | 1160 | 1060 | 370 | 320 | 790 | 790 | 960 | 970 |
| 100% Hysteresis | | | | | | | | | |
| Cycle 1 Tensile Set (%) | 6.6 | 5.5 | 6.2 | 3.2 | 3.8 | 3.3 | 3.7 | 3.5 | 3.8 |
| Cycle 1 Rec Energy (%) | 87 | 88 | 87 | 92 | 90 | 91 | 90 | 91 | 89 |
| 300% Hysteresis | | | | | | | | | |
| Cycle 1 Tensile Set (%) | 23 | 23 | 22 | 11 | 12 | 10 | 11 | 9.7 | 11 |
| Cycle 1 Rec Energy (%) | 73 | 73 | 73 | 80 | 79 | 81 | 80 | 81 | 80 |

MD = extrusion or machine direction,
TD = transverse or cross direction,
Rec energy = recovered energy.

Thermoplastic compositions were prepared using HDPE as polyolefin and different HSBCs, and details are provided in table 6. Mechanical properties of thermoplastic compositions were measured and presented in table 7.

TABLE 6

| Composition | HDPE (wt. %) | HSBC1 (wt. %) | HSBC2 (wt. %) | HSBC4 (wt. %) | HSBC5 (wt. %) | HSBC7 (wt. %) |
| --- | --- | --- | --- | --- | --- | --- |
| PC-1 | 95 | 5 | — | — | — | — |
| PC-2 | 90 | 10 | — | — | — | — |
| PC-3 | 85 | 15 | — | — | — | — |
| PC-4 | 90 | — | 10 | — | — | — |
| PC-5 | 95 | — | — | 5 | — | — |
| PC-6 | 90 | — | — | 10 | — | — |
| PC-7 | 85 | — | — | 15 | — | — |
| PC-8 | 90 | — | — | — | 10 | — |
| PC-9 | 90 | — | — | — | — | 10 |

TABLE 7

| Properties | HDPE | PC-1 | PC-2 | PC-3 | PC-4 | PC-5 | PC-6 | PC-7 | PC-8 | PC-9 |
| --- | --- | --- | --- | --- | --- | --- | --- | --- | --- | --- |
| Young's Modulus (Secant 1%) (MPa) | 740 | 740 | 680 | 610 | 700 | 710 | 670 | 570 | 670 | 690 |
| Tensile strain at Yield (%) | 7.9 | 8.3 | 8.7 | 9.5 | 9.2 | 8.5 | 9.3 | 11 | 9.1 | 9.5 |
| Tensile stress at Yield (MPa) | 18 | 17 | 16 | 14 | 17 | 16 | 16 | 15 | 16 | 17 |

TABLE 7-continued

| Properties | HDPE | PC-1 | PC-2 | PC-3 | PC-4 | PC-5 | PC-6 | PC-7 | PC-8 | PC-9 |
|---|---|---|---|---|---|---|---|---|---|---|
| Ultimate strain at break (%) | 280 | 290 | 320 | 340 | 320 | 340 | 390 | 440 | 330 | 350 |
| Elmendorf Tear Resistance (gf/mil) | 200 | 230 | 280 | 340 | 290 | 250 | 270 | 320 | 290 | 230 |

Notched Izod Impact property in terms of linear resilience was measured for thermoplastic compositions at room temperature, −20° C., and −30° C., shown in table 8.

TABLE 8

| Polyolefin Composition | AE (%) RT | LR (J/m) | AE (%) (−20° C.) | LR (J/m) | AE (%) (−30° C.) | LR (J/m) |
|---|---|---|---|---|---|---|
| PC-1 | 40 | 692 | 17 | 290 | 13 | 227 |
| PC-2 | 43 | 796 | 34 | 590 | 13 | 221 |
| PC-3 | 38 | 729 | 48 | 870 | 16 | 278 |
| PC-4 | 46 | 808 | 42 | 721 | 16 | 289 |
| PC-5 | 43 | 741 | 43 | 739 | 36 | 629 |
| PC-6 | 44 | 766 | 52 | 960 | 53 | 967 |
| PC-7 | 36 | 818 | 37 | 1020 | 51 | 51 |
| PC-8 | 47 | 840 | 58 | 1007 | 57 | 993 |
| PC-9 | 48 | 836 | 54 | 936 | 53 | 911 |
| HDPE | 37 | 647 | 26 | 450 | 25 | 440 |

AE: Absorbed Energy;
LR: Linear Resilience;
RT: room temperature

Flexural modulus of thermoplastic compositions was measured and shown in table 9.

TABLE 9

| Properties | HDPE | PC-1 | PC-2 | PC-3 | PC-4 | PC-5 | PC-6 | PC-7 | PC-8 | PC-9 |
|---|---|---|---|---|---|---|---|---|---|---|
| Flexural Modulus (Secant 1%) (MPa) | 696 | 608 | 538 | 459 | 524 | 560 | 432 | 375 | 432 | 414 |

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "includes" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. The recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A hydrogenated styrenic block copolymer represented by at least one formula selected from: S-EP-EB, (S-EP-EB)$_n$X, and S-EP-EB-EP-S, wherein n is from 2 to 30 and X is a residue of a coupling agent;

wherein prior to hydrogenation, each block S is a polymer block of a vinyl aromatic monomer, wherein the block S has a true molecular weight of 2 to 15 kg/mol, each block EP is a polyisoprene block derived from isoprene monomer, wherein the block EP has a true molecular weight of 30 to 70 kg/mol, and each block EB is a polybutadiene block derived from 1,3-butadiene monomer, wherein the block EB has a true molecular weight of 10 to 70 kg/mol, and a vinyl content of 10 to 30 wt. %, based on total weight of the polymerized 1,3-butadiene monomer in the block EB;

wherein after hydrogenation, each polyisoprene block and polybutadiene block is hydrogenated to a hydrogenation level of greater than 90%; and wherein the hydrogenated styrenic block copolymer has:

a polystyrene content (PSC) of 5 to 20 wt. %, and a peak molecular weight ($M_p$) of 40 to 300 kg/mol.

2. The hydrogenated styrenic block copolymer of claim 1, wherein the hydrogenated styrenic block copolymer has a melt flow index (MFI) at 230° C. with 5 kg load of 1 to 40 g/10 min.

3. The hydrogenated styrenic block copolymer of claim 1, wherein the block EB, prior to hydrogenation, has a vinyl content, of 15 to 30 wt. %, based on total weight of the polymerized 1,3-butadiene monomer in the block EB.

4. The hydrogenated styrenic block copolymer of claim 1, wherein the block EB, prior to hydrogenation, has a vinyl content, of 20 to 30 wt. %, based on total weight of the polymerized 1,3-butadiene monomer in the block EB.

5. The hydrogenated styrenic block copolymer of claim 1, wherein the block EB comprises 1,3-butadiene monomer incorporated by 1,2 addition in an amount of 15 to 30 wt. %, based on total weight of the polymerized 1,3-butadiene monomer in the block EB.

6. The hydrogenated styrenic block copolymer of claim 1, wherein the block S constitutes from 5 to 25 wt. %, the block EP constitutes from 40 to 65 wt. %, and the block EB constitutes from 10 to 35 wt. %, based on total weight of the hydrogenated styrenic block copolymer.

7. The hydrogenated styrenic block copolymer of claim 1, wherein the vinyl aromatic monomer is selected from the group consisting of styrene, alpha-methylstyrene, methyl styrene, para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene, dimethyl styrene, halogenated styrene, methoxy styrene, acetoxy styrene, vinyl toluene, isomers of vinyl toluene, vinyl xylene, 4-vinylbiphenyl, vinyl naphthalene, vinyl anthracene, and mixtures thereof.

8. The hydrogenated styrenic block copolymer of claim 1, wherein the hydrogenated styrenic block copolymer has a polystyrene content (PSC) of 6 to 18 wt. %.

9. The hydrogenated styrenic block copolymer of claim 1, wherein the hydrogenated styrenic block copolymer has a rubbery block containing a combination of the block EP and the block EB, and wherein the rubbery block has a glass transition temperature ($T_g$) of −70 to 0° C., measured by DSC, according to ASTM F2625.

10. The hydrogenated styrenic block copolymer of claim 1, wherein the block EB has a melting point of 40 to 100° C., measured by differential scanning calorimetry (DSC), according to ASTM F2625.

11. The hydrogenated styrenic block copolymer of claim 1, wherein a film is obtained from the hydrogenated styrenic block copolymer by compression molding at 200 to 230° C. having a thickness of 10 to 500 μm, the film has at least one of:

a 100% modulus from 1 to 5 MPa;

a 300% modulus from 2 to 6 MPa;

a 500% modulus from 2.5 to 7 MPa;

an ultimate stress of 4 to 25 MPa; and an ultimate strain from 600 to 1400%, all properties are measured according to ASTM D412.

12. The hydrogenated styrenic block copolymer of claim 1, wherein a film is obtained from the hydrogenated styrenic block copolymer by melt casting at 410 to 440° F. and pressure of 700 to 900 psi having a thickness of 10 to 500 μm, the film has at least one of:

a 100% modulus from 1 to 5 MPa;

a 300% modulus from 2 to 6 MPa;

a 500% modulus from 2.5 to 8 MPa;

an ultimate stress of 2.5 to 25 MPa; and an ultimate strain from 250 to 1100%, measured in both machine direction (MD) and transverse direction (TD) according to ASTM D412.

13. A thermoplastic composition comprising:

(a) 80 to 98 wt. % of a polyolefin;

(b) 2 to 20 wt. % of the hydrogenated styrenic block copolymer of claim 1; and (c) up to 10 wt. % of at least an additive, based on total weight of the thermoplastic composition.

14. The thermoplastic composition of claim 13, wherein the polyolefin is selected from the group consisting of polyethylene (PE), polypropylene (PP), polybutylene (PB), polyisobutylene, ethylene propylene rubber, polyvinylchloride (PVC), polydiene, polyisoprene, polydicyclopentadiene, polyethylidene norbornene, polyvinyl norbornene, low density polyethylene (LDPE), linear low density polyethylene (LLDPE), very low density polyethylene (VLDPE), high density polyethylene (HDPE), medium density polyethylene (MDPE), high molecular weight polyethylene (HMWPE), ultra-high molecular weight polyethylene (UHMWPE), high molecular weight high density polyethylene (HMW HDPE), ultrahigh molecular weight high density polyethylene (UHMW HDPE), branched low density polyethylene (BLDPE), low density polypropylene (LDPP), high density polypropylene (HDPP), high melt strength polypropylene (HMS-PP), high impact polypropylene (HIPP), isotactic polypropylene (iPP), syndiotactic polypropylene (sPP), and mixtures thereof.

15. The thermoplastic composition of claim 13, wherein the polyolefin is a post-consumer recycle (PCR) polyolefin.

16. The thermoplastic composition of claim 13, wherein the thermoplastic composition has a linear resilience:

at room temperature of 650 to 1000 J/m;

at −20° C. of 700 to 1100 J/m; and at −30° C. of 600 to 1100 J/m, measured according to ASTM D256.

17. The thermoplastic composition of claim 13, wherein the thermoplastic composition has an Elmendorf tear resistance of 150 to 400 gf/mil, measured according to ASTM D1922.

18. The thermoplastic composition of claim 13, wherein the thermoplastic composition has at least one of:

a Young's modulus of 500 to 800 MPa;

a tensile strain at yield of 5 to 15%;

a tensile stress at yield of 10 to 25 MPa;

an ultimate strain at break of 200 to 500%; and a flexural modulus of 300 to 680 MPa, all above properties measured according to ASTM D412.

19. The thermoplastic composition of claim 13, wherein the polyolefin is polyethylene having a melt flow index at 190° C. and with 2.16 kg load of 0.1 to 50 g/10 min, measured according to ASTM D1238.

20. The thermoplastic composition of claim 13, wherein the thermoplastic composition further comprises at least an additive selected from the group consisting of activators, curing agents, thickeners, coalescing agents, slip agents, release agents, antimicrobial agents, antioxidants, antiozonants, color change pH indicators, plasticizers, tackifiers, film forming additives, dyes, pigments, UV stabilizers, UV absorbers, catalysts, fillers, flame retardants, viscosity modifiers, wetting agents, deaerators, toughening agents, adhesion promoters, colorants, heat stabilizers, lubricants, flow modifiers, drip retardants, antistatic agents, stress-relief additives, blowing agents, foam nucleating agents, weld line strength promoter, and mixtures thereof.

\* \* \* \* \*